US012732873B2

(12) United States Patent
Mao

(10) Patent No.: US 12,732,873 B2
(45) Date of Patent: Sep. 8, 2026

(54) VOICE SERVICE SWITCHING METHOD AND APPARATUS AND USER EQUIPMENT

(71) Applicant: VIVO MOBILE COMMUNICATION CO., LTD., Dongguan (CN)

(72) Inventor: Yuanze Mao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 487 days.

(21) Appl. No.: 18/369,110

(22) Filed: Sep. 15, 2023

(65) Prior Publication Data

US 2024/0007906 A1 Jan. 4, 2024

Related U.S. Application Data

(63) Continuation of application No. PCT/CN2022/079925, filed on Mar. 9, 2022.

(30) Foreign Application Priority Data

Mar. 16, 2021 (CN) ........................ 202110282251.3

(51) Int. Cl.
*H04W 36/00* (2009.01)
*H04W 36/30* (2009.01)
*H04W 88/06* (2009.01)

(52) U.S. Cl.
CPC ........ *H04W 36/0011* (2013.01); *H04W 36/30* (2013.01); *H04W 88/06* (2013.01)

(58) Field of Classification Search
CPC . H04W 36/0011; H04W 36/30; H04W 36/14; H04W 36/00222; H04W 36/0058;
(Continued)

(56) References Cited

U.S. PATENT DOCUMENTS 11,039,297 B1 * 6/2021 Desai .................. H04L 65/1016
2021/0029773 A1 1/2021 Majumder et al.
(Continued)

FOREIGN PATENT DOCUMENTS

CN 106658593 A 5/2017
CN 108924887 A 11/2018
(Continued)

OTHER PUBLICATIONS

International Search Report issued in corresponding International Application No. PCT/CN2022/079925, mailed May 25, 2022, 4 pages.

(Continued)

*Primary Examiner* — Barry W Taylor
(74) *Attorney, Agent, or Firm* — IPX PLLC

(57) ABSTRACT

This application discloses a voice service switching method and apparatus, and user equipment. The voice service switching method includes: when the second SIM card executes a first voice service, sending a first switching report message to a network side device, where the first switching report message includes first network environment information; receiving a first switching command message, where the first switching command message is sent by the network side device when the first network environment information meets a first target preset condition; and executing, according to the first switching command message, a process of switching to a second voice service. When the first voice service is a VoMobile service, the second voice service is a VoWiFi service; and when the first voice service is a VoLTE service or a VoWiFi service, the second voice service is a VoMobile service.

12 Claims, 4 Drawing Sheets

(58) Field of Classification Search
CPC . H04W 36/0085; H04W 88/06; H04W 12/45; H04W 4/50
See application file for complete search history.

(56) References Cited

U.S. PATENT DOCUMENTS

| | | | | |
|---|---|---|---|---|
| 2023/0030905 | A1* | 2/2023 | Mao | H04W 8/18 |
| 2023/0319611 | A1* | 10/2023 | Lin | H04W 24/08 370/252 |
| 2023/0319655 | A1* | 10/2023 | Han | H04M 7/006 370/331 |

FOREIGN PATENT DOCUMENTS

| | | | |
|---|---|---|---|
| CN | 111294870 | A | 6/2020 |
| CN | 111479262 | A | 7/2020 |
| CN | 111479309 | A | 7/2020 |
| CN | 112954753 | A | 6/2021 |

OTHER PUBLICATIONS

First Office Action issued in related Chinese Application No. 202110282251.3, mailed Oct. 31, 2022, 7 pages.
Second Office Action issued in related Chinese Application No. 202110282251.3, mailed Feb. 11, 2023, 6 pages.
Third Office Action issued in related Chinese Application No. 202110282251.3, mailed Jun. 30, 2023, 9 pages.

* cited by examiner

VOICE SERVICE SWITCHING METHOD AND APPARATUS AND USER EQUIPMENT

This application is a continuation of International Application No. PCT/CN2022/079925, filed on Mar. 9, 2022, which claims priority to Chinese Patent Application No. 202110282251.3, filed Mar. 16, 2021. The entire contents of each of the above-identified applications are expressly incorporated herein by reference.

TECHNICAL FIELD

This application pertains to the field of communication technologies, and specifically relates to a voice service switching method and apparatus, and user equipment.

BACKGROUND

Currently, a Subscriber Identification Module (SIM) card 1 of User Equipment (UE) may be connected to a core network of an Internet Protocol Multimedia Subsystem (IMS) through a mobile network (for example, a mobile network of the SIM card 1, a mobile network of a SIM card 2, or a Wireless Fidelity (WiFi) network), to execute a voice service through the mobile network.

However, when the SIM card 1 executes the voice service through the mobile network, network quality of the mobile network may be poor. In this case, communication quality may be poor, or disconnection may occur. Consequently, service quality of the voice service of the SIM card 1 may be degraded.

As a result, service quality of a voice service of the UE is poor.

SUMMARY

Embodiments of this application provide a voice service switching method and apparatus, and user equipment.

According to a first aspect, the embodiments of this application provide a voice service switching method. UE includes a first SIM card and a second SIM card, and the method includes: in a case that the second SIM card executes a first voice service, sending a first switching report message to a network side device, where the first switching report message includes first network environment information; and the first network environment information is used to represent network quality of a mobile network corresponding to the UE when the first voice service is executed; receiving a first switching command message, where the first switching command message is sent by the network side device in a case that the first network environment information meets a first target preset condition, and the first switching command message is used to instruct the UE to switch the first voice service of the second SIM card to a second voice service; and executing, according to the first switching command message, a process of switching to the second voice service, where the first voice service is one of the following: a Voice over Mobile (VoMobile)service, a Voice over LTE (VoLTE) service, and a Voice over Wireless Fidelity (VoWiFi) service; and in a case that the first voice service is the VoMobile service, the second voice service is the VoWiFi service; and in a case that the first voice service is the VoLTE service or the VoWiFi service, the second voice service is the VoMobile service.

According to a second aspect, the embodiments of this application provide a voice service switching apparatus. The voice service switching apparatus includes a first SIM card and a second SIM card, and the voice service switching apparatus further includes a sending module, a receiving module, and an execution module. The sending module is configured to: in a case that the second SIM card executes a first voice service, send a first switching report message to a network side device, where the first switching report message includes first network environment information; and the first network environment information is used to represent network quality of a mobile network corresponding to the voice service switching apparatus when the first voice service is executed. The receiving module is configured to receive a first switching command message, where the first switching command message is sent by the network side device in a case that the first network environment information meets a first target preset condition, and the first switching command message is used to instruct the voice service switching apparatus to switch the first voice service of the second SIM card to a second voice service. The execution module is configured to execute, according to the first switching command message received by the receiving module, a process of switching to the second voice service. The first voice service is one of the following: a VoMobile service, a VoLTE service, and a VoWiFi service; and in a case that the first voice service is the VoMobile service, the second voice service is the VoWiFi service; and in a case that the first voice service is the VoLTE service or the VoWiFi service, the second voice service is the VoMobile service.

According to a third aspect, the embodiments of this application provide UE. The UE includes a processor, a memory, and a program or an instruction that is stored in the memory and that can be run on the processor, where the program or the instruction is executed by the processor to implement the steps of the method in the first aspect.

According to a fourth aspect, the embodiments of this application provide a readable storage medium. The readable storage medium stores a program or an instruction, and the program or the instruction is executed by a processor to implement the steps of the method in the first aspect.

According to a fifth aspect, the embodiments of this application provide a chip. The chip includes a processor and a communication interface, the communication interface is coupled to the processor, and the processor is configured to run a program or an instruction to implement the method in the first aspect.

In the embodiments of this application, in a case that a second SIM card executes a first voice service, UE may send a first switching report message to a network side device, where the first switching report message includes first network environment information used to represent network quality of a mobile network corresponding to the UE when the first voice service is execute; and receive a first switching command message sent by the network side device in a case that the first network environment information meets a first target preset condition, so that the UE can execute, according to the first switching command message, a process of switching to a second voice service, where the first voice service may be any one of a VoMobile service, a VoLTE service, and a VoWiFi service; and in a case that the first voice service is the VoMobile service, the second voice service is the VoWiFi service; and in a case that the first voice service is the VoLTE service or the VoWiFi service, the second voice service is the VoMobile service. When the first network environment information meets the first target preset condition, it may be considered that network quality of a mobile network (that is, a mobile network used when the second SIM card executes the first voice service) is poor, that is, in a case that the second SIM card executes the first voice service through the mobile network, if the network quality of the mobile network is poor, the UE may receive a first switching command sent by the network side device, and switch the first voice service to the second voice service, that is, switch the VoMobile service to the VoWiFi service or switch the VoLTE service (or the VoWiFi service) to the VoMobile service, so that the second SIM card can execute the second voice service through another mobile network, instead of always executing the first voice service through the mobile network. Therefore, poor call quality and disconnection can be avoided, and degrading of service quality of a voice service of the second SIM card can be avoided. In this way, service quality of a voice service of the UE can be improved.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first," "second," and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or" represents at least one of connected objects, and a character "/" generally represents an "or" relationship between associated objects.

Figure 1:
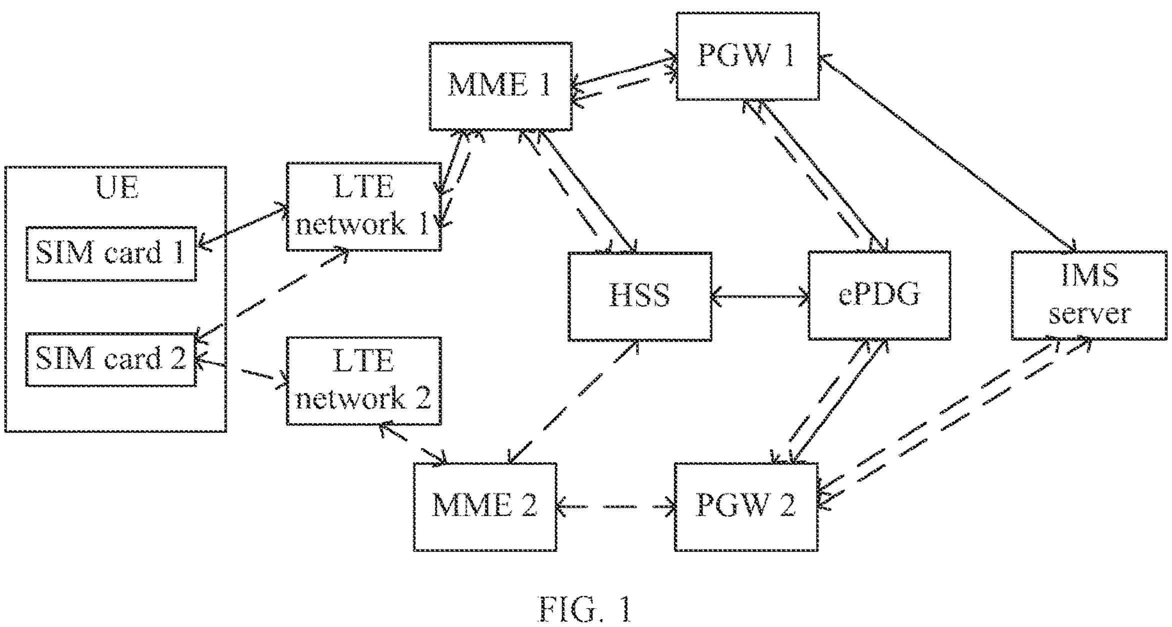
FIG. 1 is a schematic framework diagram of a network side device according to embodiments of this application.

FIG. 1 is a schematic architecture diagram of a network side device. As shown in FIG. 1, the network side device may include one or more of the following network elements:

an electronic device (for example, UE), a Mobility Management Entity (MME)network element, a Packet data GateWay (PGW) network element, an evolved Packet Data Gateway (ePDG), and a Home Subscriber Server (HSS).

A SIM card 1 and a SIM card 2 of the UE may communicate with the network side device through a mobile network (for example, a Long Term Evolution (LTE) network). In some implementations, the UE may register a Voice over LTE (VoLTE) service of the SIM card 1 through communication (shown by using solid lines in FIG. 1) between an LTE network 1 of the SIM card 1, an MME 1, a PGW 1, the HSS, and an Internet protocol Multimedia Subsystem (IMS) server through the LTE network 1, to execute the VoLTE service of the SIM card 1, and the UE may also register a VoLTE service of the SIM card 2 through communication (shown by using dashed lines in FIG. 1) between an LTE network 2 of the SIM card 2, an MME 2, a PGW 2, the HSS, and the IMS server through the LTE network 2, to execute the VoLTE service of the SIM card 2. If network quality of the LTE network 2 is poor in a process of executing the VoLTE service of the SIM card 2, the UE may register a Voice over Mobile (VoMobile) service of the SIM card 2 through communication (shown by using dashed lines in FIG. 1) between the LTE network 1, the MME 1, the PGW 1, the HSS, the ePDG, the PGW 2, and the IMS server through the LTE network 1, to execute the VoMobile service of the SIM card 2.

With reference to the accompanying drawings, a voice service switching method and apparatus, and user equipment provided in the embodiments of this application are described in detail by using embodiments and application scenarios.

The voice service switching method provided in the embodiments of this application may be applied to a scenario in which the UE executes a VoMobile service.

In a scenario, in a case that the SIM card 2 of the UE executes a VoMobile service, the UE may send a switching report message to the network side device, where the switching report message includes network environment information, and the network environment information represents network quality of a mobile network (for example, the LTE network 1 of the SIM card 1 or the LTE network 2 of the SIM card 2 (or a WiFi network connected to the UE)) corresponding to the UE when the VoMobile service is executed. Therefore, the network side device may receive the switching report message, and determine whether the network environment information meets a preset condition. In a case that the network environment information meets the preset condition, the network side device may send a switching command message to the UE, where the switching command message is used to instruct to switch the VoMobile service of the SIM card 2 to a VoLTE service (or a Voice over WiFi (VoWiFi) service). In this way, the UE may switch the VoMobile service of the SIM card 2 to the VoLTE service (or the VoWiFi service) of the SIM card 2 according to the switching command message.

In another scenario, in a case that the SIM card 2 of the UE executes a VoLTE service (or a VoWiFi service), the UE may send a switching report message to the network side device, where the switching report message includes network environment information, and the network environment information represents network quality of a mobile network (for example, the LTE network 1 of the SIM card 1 or the LTE network 2 of the SIM card 2) corresponding to the UE when the VoLTE service (or the VoWiFi service) is executed. Therefore, the network side device may receive the switching report message, and determine whether the network environment information meets a preset condition. In a case that the network environment information meets the preset condition, the network side device may send a switching command message to the UE, where the switching command message is used to instruct to switch the VoLTE service (or the VoWiFi service) of the SIM card 2 to a VoMobile service. In this way, the UE may switch the VoLTE service (or the VoWiFi service) of the SIM card 2 to the VoMobile service of the SIM card 2 according to the switching command message.

It can be understood that the UE may receive a switching command sent by the network side device, and switch a current voice service of the SIM card 2 to another voice service of the SIM card 2, to execute a voice service of the SIM card 2 through another mobile network. Therefore, poor call quality and disconnection can be avoided, and degrading of service quality of the voice service of the SIM card 2 can be avoided. In this way, service quality of a voice service of the UE can be improved.

Figure 2:
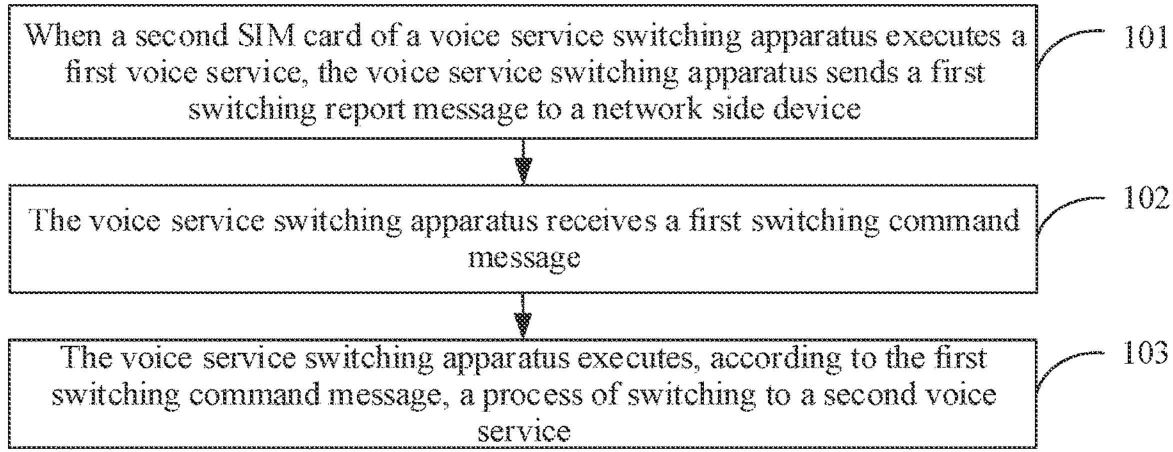
FIG. 2 is a flowchart of a first voice service switching method according to embodiments of this application.

FIG. 2 is a flowchart of a voice service switching method according to embodiments of this application. As shown in FIG. 2, the voice service switching method provided in the embodiments of this application may include the following steps 101 to 103.

Step 101: In a case that a second SIM card of a voice service switching apparatus executes a first voice service, the voice service switching apparatus sends a first switching report message to a network side device.

In the embodiments of this application, the voice service switching apparatus may be specifically: multi-SIM multi-standby UE, or multi-SIM single-standby UE, for example, dual-SIM dual-standby UE, or dual-SIM single-standby UE.

In the embodiments of this application, in a case that the second SIM card of the voice service switching apparatus executes a third voice service through a first mobile network, if network quality of the first mobile network is poor, in a case that the voice service switching apparatus displays a "setting" screen, the voice service switching apparatus may enable a voice service switching function based on a tap input performed by a user on a "voice service switching function" option on the "setting" screen, and execute a first voice registration process of the second SIM card based on a mobile network of a first SIM card, and execute a de-registration process of the third voice service, to switch the third voice service of the second SIM card to a second voice service, so that the second SIM card can execute the first voice service.

Further, optionally, in the embodiments of this application, the first mobile network may be one of the following: the mobile network of the first SIM card, a mobile network of the second SIM card, and a WiFi network (for example, a WiFi network connected to the voice service switching apparatus). In a case that the first mobile network is the mobile network of the first SIM card, the third voice service is a VoMobile service; in a case that the first mobile network is the mobile network of the second SIM card, the third voice service is a VoLTE service; and in a case that the first mobile network is the WiFi network, the third voice service is a VoWiFi service.

In the embodiments of this application, the mobile network of the first SIM card may be one of the following: a 2nd Generation (2G) mobile communication system network, a 3rd Generation (3G) mobile communication system network, an LTE network, a New Radio (NR) network, a 6th Generation (6G) mobile communication system network, and the like.

In the embodiments of this application, the mobile network of the second SIM card may be one of the following: a 2nd Generation (2G) mobile communication system network, a 3rd Generation (3G) mobile communication system network, an LTE network, a New Radio (NR) network, a 6th Generation (6G) mobile communication system network, and the like. The mobile network of the second SIM card may be the same as or different from the mobile network of the first SIM card.

In the embodiments of this application, the first voice service is one of the following: a VoMobile service, a VoLTE service, and a VoWiFi service.

In the embodiments of this application, the second SIM card of the voice service switching apparatus may execute the first voice service through a second mobile network. The second mobile network may be one of the following: the mobile network of the first SIM card, the mobile network of the second SIM card, and the WiFi network (for example, the WiFi network connected to the voice service switching apparatus). In a case that the second mobile network is the mobile network of the first SIM card, the first voice service is a VoMobile service, in a case that the second mobile network is the mobile network of the second SIM card, the first voice service is a VoLTE service; and in a case that the second mobile network is the WiFi network, the first voice service is a VoWiFi service.

It can be understood that the second mobile network is different from the first mobile network.

In the embodiments of this application, the first switching report message includes first network environment information. The first network environment information is used to represent network quality of a mobile network corresponding to the voice service switching apparatus when the first voice service is executed.

In the embodiments of this application, the mobile network corresponding to the voice service switching apparatus may include at least one of the following: the mobile network of the first SIM card, the mobile network of the second SIM card, and the WiFi network (for example, the WiFi network connected to the voice service switching apparatus).

In the embodiments of this application, in a process in which the second SIM card executes the first voice service, the voice service switching apparatus may detect the network quality of the mobile network corresponding to the voice service switching apparatus in real time, to obtain the first network environment information, and therefore the voice service switching apparatus may send the first switching report message including the first network environment information.

In some implementations of this application, the voice service switching apparatus may send a first switching message to the network side device at a preset time interval.

It can be understood that the voice service switching apparatus may send one first switching message to the network side device at the preset time interval, so that when network quality of the mobile network of the first SIM card is poor, a first switching command message sent by the network side device can be received.

In another implementation of this application, the voice service switching apparatus may send the first switching report message to the network side device when a third target preset condition is met.

Further, in the embodiments of this application, in a case that the first voice service is a VoMobile service, the third target preset condition may include one of the following:

- a value of a network quality parameter (for example, a first network quality parameter in the following embodiments) of the mobile network of the first SIM card is less than or equal to a threshold, for example, a first threshold in the following embodiments;

the voice service switching apparatus has received information that is sent by the network side device and that is used to indicate that the mobile network of the first SIM card is abnormal, for example, first information in the following embodiments;

a value of a network quality parameter (for example, a second network quality parameter in the following embodiments) of the mobile network of the second SIM card is less than or equal to another threshold, for example, a second threshold in the following embodiments; and the voice service switching apparatus is connected to a WiFi network and a value of a network signal parameter of the WiFi network is greater than another threshold, for example, a third threshold in the following embodiments.

In the embodiments of this application, if the third target preset condition is met, it may be considered that the network quality of the mobile network of the first SIM card is poor, and/or network quality of another mobile network is good. Therefore, the voice service switching apparatus may send the first switching report message to the network side device, so that the network side device may instruct the voice service switching apparatus to switch the VoMobile service of the second SIM card to another voice service (that is, a VoLTE service or a VoWiFi service).

Further, optionally, in the embodiments of this application, in a case that the first voice service is a VoLTE service (or a VoWiFi service), the third target preset condition may include one of the following:

the voice service switching apparatus is not connected to a target mobile network;

a value of a network quality parameter of the target mobile network is less than or equal to a threshold;

the voice service switching apparatus has received information that is sent by the network side device and that is used to indicate that the target mobile network is abnormal, for example, second information in the following embodiments; and a value of a first network quality parameter is greater than a first threshold.

In the embodiments of this application, the target mobile network may be any one of the following: the mobile network of the second SIM card and the WiFi network.

In the embodiments of this application, if the third target preset condition is met, it may be considered that network quality of the target mobile network is poor, and/or the network quality of the mobile network of the first SIM card is good. Therefore, the voice service switching apparatus may send the first switching report message to the network side device, so that the network side device may instruct the voice service switching apparatus to switch the VoLTE service (or the VoWiFi service) of the second SIM card to a VoMobile service.

It can be understood that the voice service switching apparatus may send the first switching report message to the network side device only when the third target preset condition is met. Therefore, power consumption of the voice service switching apparatus can be reduced.

Step 102: The voice service switching apparatus receives a first switching command message.

In the embodiments of this application, the first switching command message is sent by the network side device in a case that the first network environment information meets a first target preset condition, and the first switching command message is used to instruct the voice service switching apparatus to switch the first voice service of a second SIM card to the second voice service.

In the embodiments of this application, in a case that the first voice service is a VoMobile service, the second voice service is a VoWiFi service; and in a case that the first voice service is a VoLTE service or a VoWiFi service, the second voice service is a VoMobile service.

It can be understood that the second voice service may be one of the following: a VoWiFi service, a VoMobile service, and the like.

In the embodiments of this application, in a case that the first voice service is a VoMobile service, the first target preset condition may include N preset conditions or M preset conditions. The N preset conditions correspond to one voice service, and the M preset conditions correspond to another voice service. Therefore, the network side device may determine a preset condition that the first network environment information meets, and determine a voice service (that is, the second voice service) corresponding to the preset condition that the first network environment information meets, to send the first switching command message to the voice service switching apparatus, where both M and N are positive integers.

It can be understood that the first target preset condition may include different preset conditions. When the first network environment information meets different preset conditions, the second voice service is a different voice service.

Further, in the embodiments of this application, in a case that the first target preset condition includes N preset conditions, the second voice service may be a VoLTE service; and in a case that the first target preset condition includes M preset conditions, the target voice service may be a VoWiFi service.

It can be understood that the network side device may determine the most suitable mobile network (for example, a mobile network with best network quality, and/or lowest communication costs) from the mobile network corresponding to the voice service switching apparatus, and instruct the voice service switching apparatus to execute a voice service of the second SIM card based on the most suitable mobile network.

In the embodiments of this application, in a case that the first voice service is a VoLTE service (or a VoWiFi service), the first target preset condition may include Q preset conditions, and the Q preset conditions correspond to one voice service. Therefore, the network side device may determine a preset condition that the first network environment information meets, and determine a voice service (that is, the second voice service) corresponding to the preset condition that the first network environment information meets, to send the first switching command message to the voice service switching apparatus, where Q is a positive integer.

Step 103: The voice service switching apparatus executes, according to the first switching command message, a process of switching to the second voice service.

In the embodiments of this application, the voice service switching apparatus may first execute a registration process of the second voice service, and then execute a de-registration process of the VoMobile service of the second SIM card, to execute the process of switching to the second voice service.

According to the voice service switching method provided in the embodiments of this application, in a case that a second SIM card executes a first voice service, a voice service switching apparatus may send a first switching report message to a network side device, where the first switching report message includes first network environment information used to represent network quality of a mobile network corresponding to the voice service switching apparatus when the first voice service is executed; and receive a first switching command message sent by the network side device in a case that the first network environment information meets a first target preset condition, so that the voice service switching apparatus may execute, according to the first switching command message, a process of switching to a second voice service, where the first voice service may be any one of a VoMobile service, a VoLTE service, and a VoWiFi service. In a case that the first voice service is a VoMobile service, the second voice service is a VoWiFi service; and in a case that the first voice service is a VoLTE service or a VoWiFi service, the second voice service is a VoMobile service. When the first network environment information meets the first target preset condition, it may be considered that network quality of a mobile network (that is, a mobile network used when the second SIM card executes the first voice service) is poor, that is, in a case that the second SIM card executes the first voice service through the mobile network, if the network quality of the mobile network is poor, the voice service switching apparatus may receive a first switching command sent by the network side device, and switch the first voice service to the second voice service, that is, switch a VoMobile service to a VoWiFi service, or switch a VoLTE service (or a VoWiFi service) to a VoMobile service, so that the second SIM card can execute the second voice service through another mobile network, instead of always executing the first voice service through the mobile network. Therefore, poor call quality and disconnection can be avoided, and decreasing of service quality of a voice service of the second SIM card can be avoided. In this way, service quality of a voice service of the voice service switching apparatus can be improved.

The following separately uses examples in which the first voice service is a VoMobile service, a VoLTE service, or a VoWiFi service to describe how the voice service switching apparatus executes the process of switching to the second voice service.

Figures 3, 4:
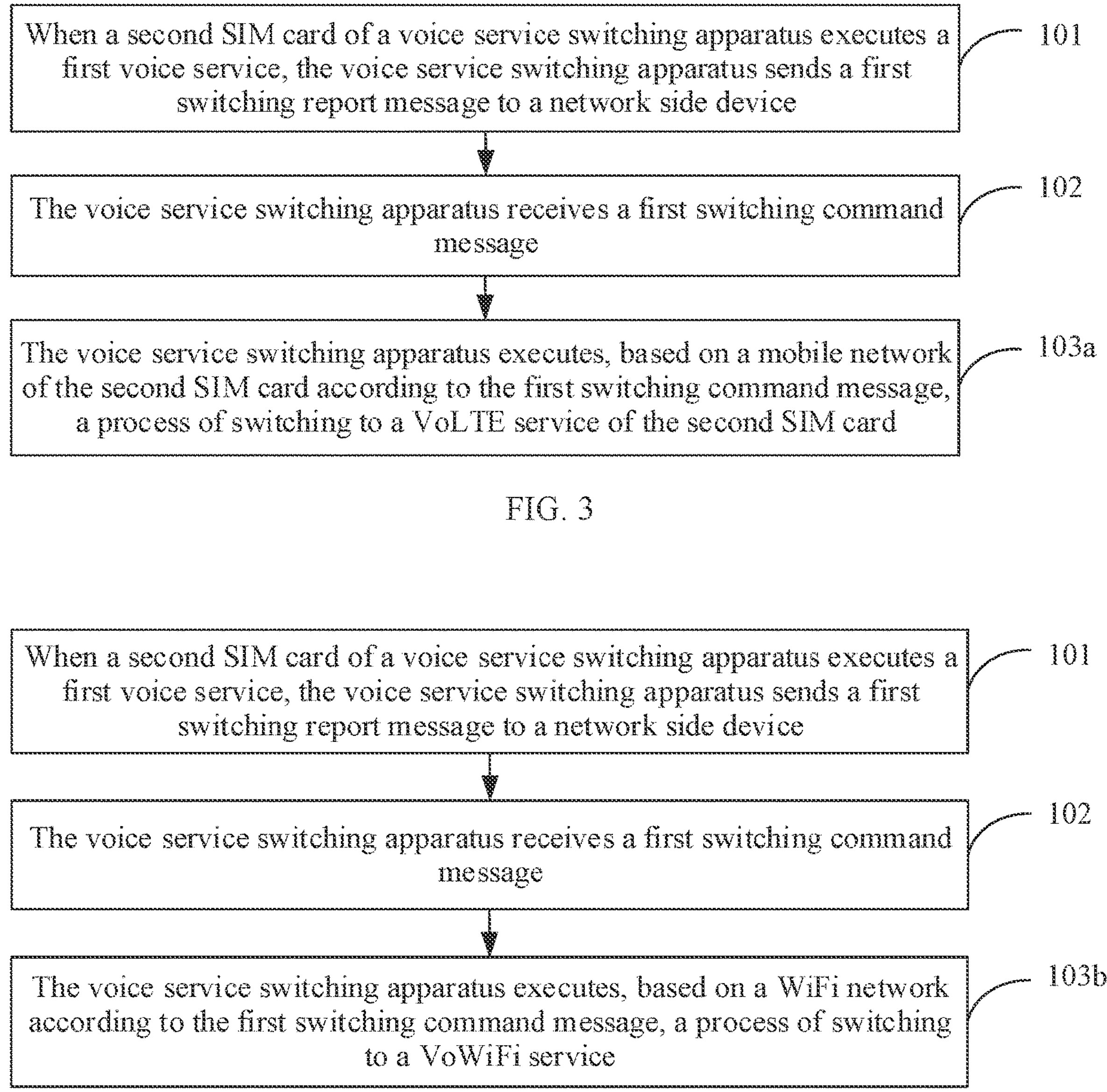
FIG. 3 is a flowchart of a second voice service switching method according to embodiments of this application.
FIG. 4 is a flowchart of a third voice service switching method according to embodiments of this application.

In an implementation of this application, the first voice service is the VoMobile service, and the second voice service is the VoLTE service; the first network environment information includes a first network quality parameter of a mobile network of the first SIM card and a second network quality parameter of a mobile network of the second SIM card; and the first target preset condition includes a first preset condition and a sixth preset condition. Specifically, with reference to FIG. 2, as shown in FIG. 3, the foregoing step 103 may be specifically implemented by the following step 103*a*.

Step 103*a*: The voice service switching apparatus executes, based on the mobile network of the second SIM card according to the first switching command message, a process of switching to the VoLTE service of the second SIM card.

It can be understood that the N preset conditions are the first preset condition and the sixth preset condition.

In the embodiments of this application, the first preset condition includes at least one of the following: a value of the first network quality parameter is less than or equal to a first threshold, and the first network environment information includes first information; and the first information is used to indicate that the mobile network of the first SIM card is abnormal.

Further, in the embodiments of this application, a value of the first network quality parameter may include one of the following: Reference Signal Received Power (RSRP), Reference Signal Received Quality (reference signal received quality, RSRQ), a Signal to Noise Ratio (SNR), a Channel Quality Indicator (CQI), and the like.

Further, in the embodiments of this application, the first information may be a specific exception code.

Further, in the embodiments of this application, the first preset condition may further include: a packet loss rate of the mobile network of the first SIM card is greater than a fourth threshold.

In the embodiments of this application, the sixth preset condition includes any one of the following: a value of the second network quality parameter is greater than a second threshold; the first network environment information does not include a network signal parameter of a WiFi network; and the first network environment information includes a network signal parameter of a WiFi network and a value of the network signal parameter is less than or equal to a third threshold.

Further, in the embodiments of this application, the second network quality parameter may include one of the following: RSRP, RSRQ, an SNR, a CQI, and the like.

Further, in the embodiments of this application, the second threshold may be specifically a preset threshold in the voice service switching apparatus, or a threshold determined based on a value of the first network quality parameter.

It can be understood that, in a case that the second threshold is the threshold determined based on the value of the first network quality parameter, if a value of the second network quality parameter is greater than the second threshold, it may be considered that network quality of the mobile network of the second SIM card is better than network quality of the mobile network of the first SIM card.

Further, in the embodiments of this application, the network signal parameter of the WiFi network may include at least one of the following: RSRP, RSRQ, and an SNR.

Further, in the embodiments of this application, the sixth preset condition may further include: a packet loss rate of the mobile network of the second SIM card is less than a fifth threshold.

In the embodiments of this application, if a value of the first network quality parameter is less than or equal to the first threshold, and/or the first network environment information includes the first information, it may be considered that the network quality of the mobile network of the first SIM card is poor, and/or that the mobile network of the first SIM card is abnormal. If a value of the second network quality parameter is greater than the second threshold, it may be considered that network quality of an LTE network of the second SIM card is good. If the first network environment information does not include the network signal parameter of the WiFi network, it may be considered that the voice service switching apparatus is not connected to the WiFi network. If the first network environment information includes the network signal parameter of the WiFi network and a value of the network signal parameter is less than or equal to the third threshold, it may be considered that network quality of the WiFi network is poor. Therefore, the voice service switching apparatus may execute, based on a mobile network (that is, an LTE network) of the second SIM card, the process of switching to the VoLTE service of the second SIM card, to execute the voice service of the second SIM card through the LTE network of the second SIM card.

Further, in the embodiments of this application, the first switching command message may include information about a PGW 2 network element of the network side device. Therefore, the voice service switching apparatus may first obtain the information about the PGW 2 network element according to the first switching command message, and through the mobile network of the second SIM card, register the second voice service (that is, the VoLTE service) according to the information about the PGW 2 network element, to execute a registration process of the VoLTE service, and then send a VoLTE service registration success message to the network side device, so that the PGW 2 network element of the network side device can initiate release of related bearer resources of the first voice service (that is, the VoMobile service) of the second SIM card, and the voice service switching apparatus may initiate de-attachment of an ePDG network element from the second SIM card, to execute a de-registration process of the VoMobile service of the second SIM card, and execute the process of switching to the VoLTE service.

Further, in the embodiments of this application, after the voice service switching apparatus executes the process of switching to the second voice service, if a value of the second network quality parameter is less than or equal to the second threshold, the voice service switching apparatus may switch the LTE network of the second SIM card to another network (for example, a 2G network or a 3G network), so that the second SIM card may execute a voice service through the another network.

In this way, it can be learned that, because in a case that network quality of the mobile network of the first SIM card is poor and network quality of the mobile network of the second SIM card is good (and/or the voice service switching apparatus is not connected to a WiFi network and/or network quality of a connected WiFi network is poor), the voice service switching apparatus may receive a first switching command sent by the network side device, and execute the process of switching to the VoLTE service, so that the second SIM card can execute a voice service through the mobile network of the second SIM card. Therefore, service quality of a voice service of the voice service switching apparatus can be improved.

In another implementation of this application, the first voice service is the VoMobile service, and the second voice service is the VoWiFi service; the first network environment information includes a first network quality parameter of a mobile network of the first SIM card and a network signal parameter of a WiFi network; and the first target preset condition includes a first preset condition and a second preset condition. With reference to FIG. 2, as shown in FIG. 4, the foregoing step 103 may be specifically implemented by the following step 103*b*.

Step 103*b*: The voice service switching apparatus executes, based on the WiFi network according to the first switching command message, a process of switching to the VoWiFi service.

It can be understood that the M preset conditions include the first preset condition and the second preset condition.

In the embodiments of this application, the first preset condition includes at least one of the following: a value of the first network quality parameter is less than or equal to a first threshold, and the first network environment information includes first information; and the first information is used to indicate that the mobile network of the first SIM card is abnormal.

It should be noted that for descriptions of a value of the first network quality parameter, refer to the specific descriptions in the foregoing embodiments. Details are not described herein again in the embodiments of this application.

In the embodiments of this application, the second preset condition is that a value of the network signal parameter of the WiFi network is greater than a third threshold.

In the embodiments of this application, if a value of the first network quality parameter is less than or equal to the first threshold and/or the first network environment information includes the first information, it may be considered that the network quality of the mobile network of the first SIM card is poor and/or that the mobile network of the first SIM card is abnormal. If the first network environment information includes the network signal parameter of the WiFi network and a value of the network signal parameter is greater than the third threshold, it may be considered that the voice service switching apparatus is connected to the WiFi network and the network quality of the WiFi network is good. Therefore, the voice service switching apparatus may execute, based on the WiFi network with good network quality and low communication costs, the process of switching to the VoWiFi service of the second SIM card, to execute the voice service of the second SIM card through the WiFi network.

Further, in the embodiments of this application, the first switching command message may include address information of an ePDG network element of the network side device. Therefore, the voice service switching apparatus may first obtain the address information of the ePDG network element according to the first switching command message, and register the second voice service (that is, the VoWiFi service) through the WiFi network according to the address information of the ePDG network element, to execute a registration process of the VoWiFi service, and then send a VoWiFi service registration success message to the network side device, so that the PGW 2 network element of the network side device can initiate release of related bearer resources of the first voice service (that is, the VoMobile service) of the second SIM card, and execute a de-registration process of the VoMobile service of the second SIM card, to execute the process of switching to the VoWiFi service.

In this way, it can be learned that, because in a case that network quality of the mobile network of the first SIM card is poor, and the voice service switching apparatus is connected to the WiFi network and network quality of the WiFi network is good, the voice service switching apparatus may receive a first switching command sent by the network side device, and execute the process of switching to the VoWiFi service, to execute a voice service of the second SIM card through the WiFi network. Therefore, service quality of a voice service of the voice service switching apparatus can be improved.

Figure 5:
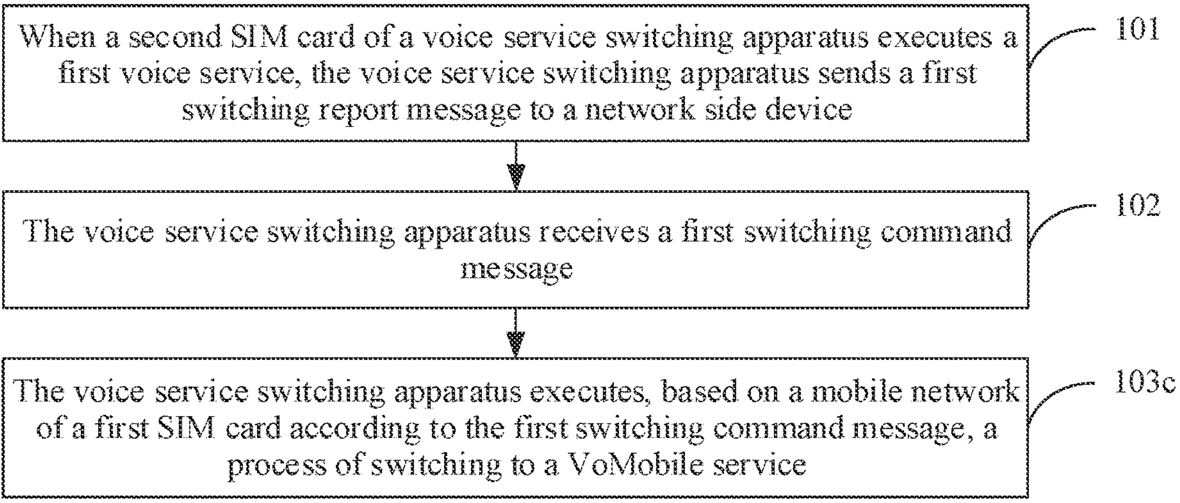
FIG. 5 is a flowchart of a fourth voice service switching method according to embodiments of this application.

In another implementation of this application, the first voice service is the VoLTE service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition. With reference to FIG. 2, as shown in FIG. 5, the foregoing step 103 may be implemented by the following step 103*c*.

Step 103*c*: The voice service switching apparatus executes, based on the mobile network of the first SIM card according to the first switching command message, a process of switching to the VoMobile service.

It can be understood that the Q preset conditions include the third preset condition, the fourth preset condition, and the fifth preset condition.

Further, in the embodiments of this application, the first switching command message may include address information of an ePDG network element of the network side device. Therefore, the voice service switching apparatus may obtain the address information of the ePDG network element according to the first switching command message, and through the mobile network of the first SIM card, register the second voice service (that is, the VoMobile service) according to the address information of the ePDG network element, to execute a registration process of the VoMobile service, and then send a VoMobile service registration success message to the network side device, so that the network side device can initiate release of related bearer resources of the first voice service (that is, the VoLTE service) of the second SIM card, and execute a de-registration process of the VoLTE service of the second SIM card, to execute the process of switching to the VoMobile service.

In the embodiments of this application, the third preset condition is that a value of the first network quality parameter is greater than a first threshold.

It should be noted that for descriptions of a value of the first network quality parameter, refer to the specific descriptions in the foregoing embodiments. Details are not described herein again in the embodiments of this application.

In the embodiments of this application, the fourth preset condition is one of the following: a value of the second network quality parameter is less than or equal to a second threshold, and the first network environment information includes second information; and the second information is used to indicate that the mobile network of the second SIM card is abnormal.

It should be noted that for descriptions of the second network quality parameter, refer to the specific descriptions in the foregoing embodiments. Details are not described herein again in the embodiments of this application.

Further, in the embodiments of this application, the second information may be a specific exception code.

Further, in the embodiments of this application, the fourth preset condition may further include: a packet loss rate of the mobile network of the second SIM card is less than or equal to a fifth threshold.

In the embodiments of this application, the fifth preset condition is one of the following: the first network environment information does not include a network signal parameter of a WiFi network; and the first network environment information includes a network signal parameter of a WiFi network and a value of the network signal parameter is less than or equal to a third threshold.

In the embodiments of this application, if a value of the first network quality parameter is greater than the first threshold, it may be considered that the network quality of the mobile network of the first SIM card is good. If a value of the second network quality parameter is less than or equal to the second threshold and/or the first network environment information includes the second information, it may be considered that the network quality of the mobile network of the second SIM card is poor and/or that the mobile network of the second SIM card is abnormal. If the first network environment information does not include the network signal parameter of the WiFi network, it may be considered that the voice service switching apparatus is not connected to the WiFi network. If the first network environment information includes the network signal parameter of the WiFi network and a value of the network signal parameter is less than or equal to the third threshold, it may be considered that the voice service switching apparatus is connected to the WiFi network and the network quality of the WiFi network is poor. Therefore, the voice service switching apparatus may execute, according to the first switching command message, the process of switching to the VoMobile service of the second SIM card, to execute a voice service of the second SIM card through an LTE network of the first SIM card.

In this way, it can be learned that, in a case that network quality of the mobile network of the first SIM card is good, network quality of the mobile network of the second SIM card is poor (and/or the mobile network of the second SIM card is abnormal), and the voice service switching apparatus is not connected to a WiFi network (and/or network quality of a connected WiFi network is poor), the voice service switching apparatus may receive a first switching command sent by the network side device, and execute the process of switching to the VoMobile service, to execute a voice service of the second SIM card through the mobile network of the first SIM card. Therefore, service quality of a voice service of the voice service switching apparatus can be improved.

In another implementation of this application, the first voice service is the VoWiFi service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition. In some implementations, the foregoing step 103 may be implemented by the following step 103*d*.

Step 103*d*: The voice service switching apparatus executes, based on the mobile network of the first SIM card according to the first switching command message, a process of switching to the VoMobile service.

It should be noted that for descriptions of the process of switching to the VoMobile service, refer to the specific descriptions in the foregoing embodiments. Details are not described herein again in the embodiments of this application.

In the embodiments of this application, the third preset condition is that a value of the first network quality parameter is greater than a first threshold.

In the embodiments of this application, the fourth preset condition includes at least one of the following: a value of the second network quality parameter is less than or equal to a second threshold, and the first network environment information includes second information; and the second information is used to indicate that the mobile network of the second SIM card is abnormal.

In the embodiments of this application, the fifth preset condition is one of the following: the first network environment information does not include a network signal parameter of a WiFi network; and the first network environment information includes a network signal parameter of a WiFi network and a value of the network signal parameter is less than or equal to a third threshold.

In this way, it can be learned that, in a case that network quality of the mobile network of the first SIM card is good, network quality of the mobile network of the second SIM card is poor (and/or the mobile network of the second SIM card is abnormal), and the voice service switching apparatus is not connected to a WiFi network (and/or network quality of a connected WiFi network is poor), the voice service switching apparatus may receive a first switching command sent by the network side device, and execute the process of switching to the VoMobile service, to execute a voice service of the second SIM card through the mobile network of the first SIM card. Therefore, service quality of a voice service of the voice service switching apparatus can be improved.

It should be noted that the voice service switching method provided in the embodiments of this application may be performed by a voice service switching apparatus, or a control module that is in the voice service switching apparatus and that is configured to perform the voice service switching method. In the embodiments of this application, that the voice service switching apparatus performs the voice service switching method is used as an example to describe the voice service switching method provided in the embodiments of this application.

Figure 6:
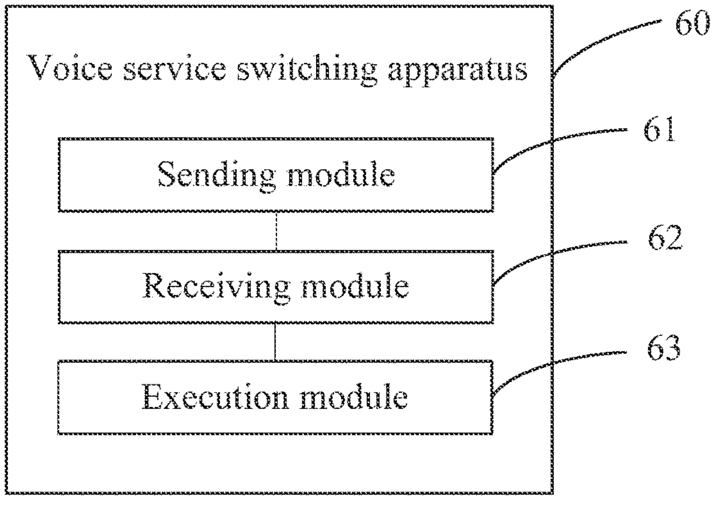
FIG. 6 is a block diagram of a voice service switching apparatus according to embodiments of this application.

FIG. 6 is a schematic structural diagram of a voice service switching apparatus according to embodiments of this application. The voice service switching apparatus includes a first SIM card and a second SIM card. As shown in FIG. 6, the voice service switching apparatus 60 may include a sending module 61, a receiving module 62, and an execution module 63.

The sending module 61 is configured to: in a case that the second SIM card executes a first voice service, send a first switching report message to a network side device, where the first switching report message includes first network environment information; and the first network environment information is used to represent network quality of a mobile network corresponding to the voice service switching apparatus 60 when the first voice service is executed. The receiving module 62 is configured to receive a first switching command message, where the first switching command message is sent by the network side device in a case that the first network environment information meets a first target preset condition, and the first switching command message is used to instruct the voice service switching apparatus 60 to switch the first voice service of the second SIM card to a second voice service. The execution module 63 is configured to execute, according to the first switching command message received by the receiving module 62, a process of switching to the second voice service. The first voice service is one of the following: a VoMobile service, a VoLTE service, and a VoWiFi service; and in a case that the first voice service is the VoMobile service, the second voice service is the VoWiFi service; and in a case that the first voice service is the VoLTE service or the VoWiFi service, the second voice service is the VoMobile service.

In an implementation, the first voice service is the VoMobile service, and the second voice service is the VoLTE service; the first network environment information includes a first network quality parameter of a mobile network of the first SIM card and a second network quality parameter of a mobile network of the second SIM card; and the first target preset condition includes a first preset condition and a sixth preset condition. The execution module 63 is specifically configured to execute, based on the mobile network of the second SIM card, a process of switching to the VoLTE service of the second SIM card. The first preset condition includes at least one of the following: a value of the first network quality parameter is less than or equal to a first threshold, and the first network environment information includes first information; and the first information is used to indicate that the mobile network of the first SIM card is abnormal. The sixth preset condition includes any one of the following: a value of the second network quality parameter is greater than a second threshold; the first network environment information does not include a network signal parameter of a WiFi network; and the first network environment information includes a network signal parameter of a WiFi network and a value of the network signal parameter is less than or equal to a third threshold.

In an implementation, the first voice service is the VoMobile service, and the second voice service is the VoWiFi service; the first network environment information includes a first network quality parameter of a mobile network of the first SIM card and a network signal parameter of a WiFi network; and the first target preset condition includes a first preset condition and a second preset condition. The execution module 63 is specifically configured to execute, based on the WiFi network, a process of switching to the VoWiFi service. The first preset condition includes at least one of the following: a value of the first network quality parameter is less than or equal to a first threshold, and the first network environment information includes first information; and the first information is used to indicate that the mobile network of the first SIM card is abnormal. The second preset condition is that a value of the network signal parameter is greater than a third threshold.

In an implementation, the first voice service is the VoLTE service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition. The execution module 63 is specifically configured to execute, based on the mobile network of the first SIM card, a process of switching to the VoMobile service. The third preset condition is that a value of the first network quality parameter is greater than a first threshold. The fourth preset condition is one of the following: a value of the second network quality parameter is less than or equal to a second threshold, and the first network environment information includes second information; and the second information is used to indicate that the mobile network of the second SIM card is abnormal. The fifth preset condition is one of the following: the first network environment information does not include a network signal parameter of a WiFi network; and the first network environment information includes a network signal parameter of a WiFi network and a value of the network signal parameter is less than or equal to a third threshold.

In an implementation, the first voice service is the VoWiFi service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition. The execution module 63 is specifically configured to execute, based on the mobile network of the first SIM card, a process of switching to the VoMobile service. The third preset condition is that a value of the first network quality parameter is greater than a first threshold. The fourth preset condition includes at least one of the following: a value of the second network quality parameter is less than or equal to a second threshold, and the first network environment information includes second information; and the second information is used to indicate that the mobile network of the second SIM card is abnormal. The fifth preset condition is one of the following: the first network environment information does not include a network signal parameter of a WiFi network; and the first network environment information includes a network signal parameter of a WiFi network and a value of the network signal parameter is less than or equal to a third threshold.

According to the voice service switching apparatus provided in the embodiments of this application, when first network environment information meets a first target preset condition, it may be considered that network quality of a mobile network (that is, a mobile network used when a second SIM card executes a first voice service) is poor, that is, in a case that the second SIM card executes the first voice service through the mobile network, if the network quality of the mobile network is poor, the voice service switching apparatus may receive a first switching command sent by a network side device, and switch the first voice service to a second voice service, that is, switch a VoMobile service to a VoWiFi service, or switch a VoLTE service (or a VoWiFi service) to a VoMobile service, so that the second SIM card can execute the second voice service through another mobile network, instead of always executing the first voice service through the mobile network. Therefore, poor call quality and disconnection can be avoided, and degrading of service quality of a voice service of the second SIM card can be avoided. In this way, service quality of a voice service of the voice service switching apparatus can be improved.

The voice service switching apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine, or a self-service machine. This is not specifically limited in the embodiments of this application.

The voice service switching apparatus in the embodiments of this application may be an apparatus with an operating system. The operating system may be an Android operating system, an iOS operating system, or another possible operating system. This is not specifically limited in the embodiments of this application.

The voice service switching apparatus provided in the embodiments of this application can implement the processes implemented in the method embodiments in FIG. 2 to FIG. 5. To avoid repetition, details are not described herein again.

Figure 7:
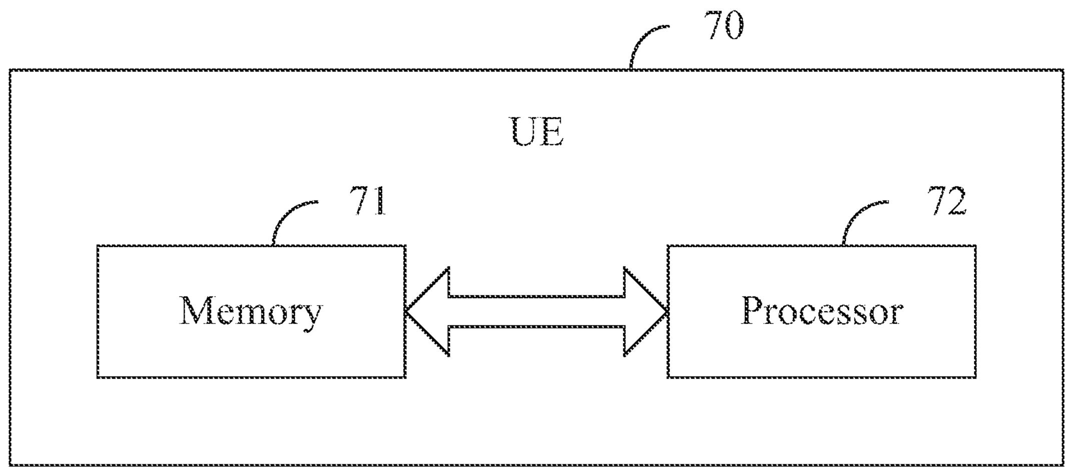
FIG. 7 is a block diagram of UE according to embodiments of this application.

As shown in FIG. 7, the embodiments of this application further provide UE 70, including a processor 72, a memory 71, and a program or an instruction that is stored in the memory 71 and that can be run on the processor 72. The program or the instruction is executed by the processor 72 to implement the processes of the foregoing voice service switching method embodiments and a same technical effect can be achieved. To avoid repetition, details are not described herein again.

It should be noted that the UE in the embodiments of this application includes the foregoing mobile electronic device and the foregoing non-mobile electronic device.

Figure 8:
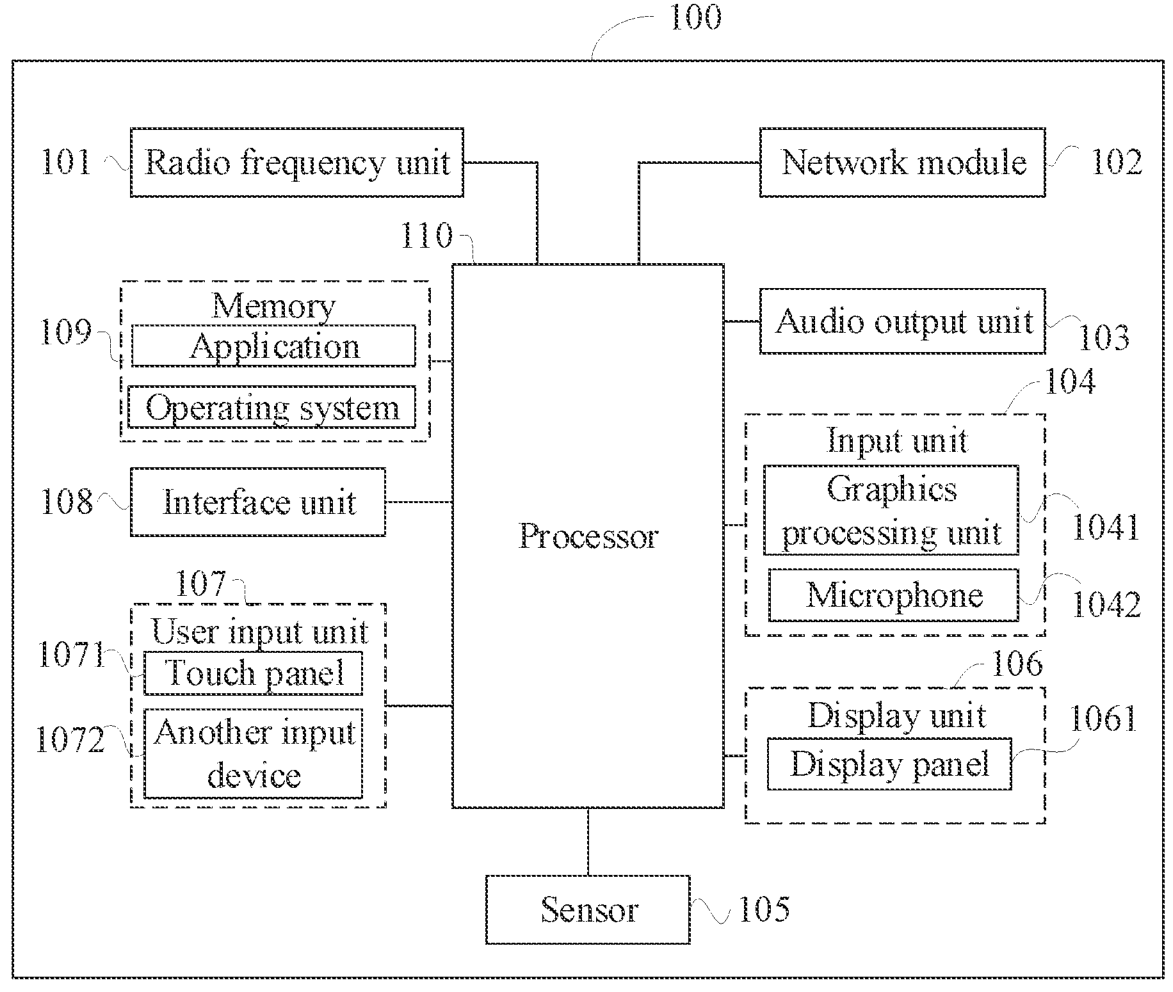
FIG. 8 is a schematic diagram of hardware of UE according to embodiments of this application.

FIG. 8 is a schematic structural diagram of hardware of UE according to embodiments of this application. The UE includes a first SIM card and a second SIM card.

The UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the UE 100 may further include a power supply (for example, a battery) that supplies power to each component. The power supply may be logically connected to the processor 110 by using a power supply management system, to implement functions such as charging and discharging management, and power consumption management by using the power supply management system. The structure of the UE shown in FIG. 8 constitutes no limitation on the UE, and the UE may include more or fewer components than those shown in the figure, or combine some components, or have different component arrangements. Details are not described herein.

The radio frequency unit 101 is configured to: in a case that the second SIM card executes a first voice service, send a first switching report message to a network side device, where the first switching report message includes first network environment information; and the first network environment information is used to represent network quality of a mobile network corresponding to the UE when the first voice service is executed; and receive a first switching command message, where the first switching command message is sent by the network side device in a case that the first network environment information meets a first target preset condition, and the first switching command message is used to instruct the UE to switch the first voice service of the second SIM card to a second voice service.

The processor 110 is configured to execute a registration process of the second voice service according to the first switching command message.

The first voice service is one of the following: a VoMobile service, a VoLTE service, and a VoWiFi service; and in a case that the first voice service is the VoMobile service, the second voice service is the VoWiFi service; and in a case that the first voice service is the VoLTE service or the VoWiFi service, the second voice service is the VoMobile service.

According to the UE provided in the embodiments of this application, when first network environment information meets a first target preset condition, it may be considered that network quality of a mobile network (that is, a mobile network used when a second SIM card executes a first voice service) is poor, that is, in a case that the second SIM card executes the first voice service through the mobile network, if the network quality of the mobile network is poor, the UE may receive a first switching command sent by a network side device, and switch the first voice service to a second voice service, that is, switch a VoMobile service to a VoWiFi service, or switch a VoLTE service (or a VoWiFi service) to a VoMobile service, so that the second SIM card can execute the second voice service through another mobile network, instead of always executing the first voice service through the mobile network. Therefore, poor call quality and disconnection can be avoided, and degrading of service quality of a voice service of the second SIM card can be avoided. In this way, service quality of a voice service of the UE can be improved.

In the embodiments of this application, the first voice service is the VoMobile service, and the second voice service is the VoLTE service; the first network environment information includes a first network quality parameter of a mobile network of the first SIM card and a second network quality parameter of a mobile network of the second SIM card; and the first target preset condition includes a first preset condition and a sixth preset condition.

The radio frequency unit 101 is configured to execute, based on the mobile network of the second SIM card, a process of switching to the VoLTE service of the second SIM card.

In the embodiments of this application, the first preset condition includes at least one of the following: a value of the first network quality parameter is less than or equal to a first threshold, and the first network environment information includes first information; and the first information is used to indicate that the mobile network of the first SIM card is abnormal.

In the embodiments of this application, the sixth preset condition includes any one of the following: a value of the second network quality parameter is greater than a second threshold; the first network environment information does not include a network signal parameter of a WiFi network; and the first network environment information includes a network signal parameter of a WiFi network and a value of the network signal parameter is less than or equal to a third threshold.

In this way, it can be learned that, because in a case that network quality of the mobile network of the first SIM card is poor and network quality of the mobile network of the second SIM card is good (and/or the UE is not connected to a WiFi network and/or network quality of a connected WiFi network is poor), the UE may receive a first switching command sent by the network side device, and execute the process of switching to the VoLTE service, so that the second SIM card can execute a voice service through the mobile network of the second SIM card. Therefore, service quality of a voice service of the UE can be improved.

In the embodiments of this application, the first voice service is the VoMobile service, and the second voice service is the VoWiFi service; the first network environment information includes a first network quality parameter of a mobile network of the first SIM card and a network signal parameter of a WiFi network; and the first target preset condition includes a first preset condition and a second preset condition.

The radio frequency unit 101 is specifically configured to execute, based on the WiFi network, a process of switching to the VoWiFi service.

In the embodiments of this application, the first preset condition includes at least one of the following: a value of the first network quality parameter is less than or equal to a first threshold, and the first network environment information includes first information; and the first information is used to indicate that the mobile network of the first SIM card is abnormal.

In the embodiments of this application, the second preset condition is that a value of the network signal parameter of the WiFi network is greater than a third threshold.

In this way, it can be learned that, because in a case that network quality of the mobile network of the first SIM card is poor, and the UE is connected to the WiFi network and network quality of the WiFi network is good, the UE may receive a first switching command sent by the network side device, and execute the process of switching to the VoWiFi service, to execute a voice service of the second SIM card through the WiFi network. Therefore, service quality of a voice service of the UE can be improved.

In the embodiments of this application, the first voice service is the VoLTE service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition.

The radio frequency unit 101 is specifically configured to execute, based on the mobile network of the first SIM card, a process of switching to the VoMobile service.

In the embodiments of this application, the third preset condition is that a value of the first network quality parameter is greater than a first threshold.

In the embodiments of this application, the fourth preset condition is one of the following: a value of the second network quality parameter is less than or equal to a second threshold, and the first network environment information includes second information; and the second information is used to indicate that the mobile network of the second SIM card is abnormal.

In the embodiments of this application, the fifth preset condition is one of the following: the first network environment information does not include a network signal parameter of a WiFi network; and the first network environment information includes a network signal parameter of a WiFi network and a value of the network signal parameter is less than or equal to a third threshold.

In this way, it can be learned that, in a case that network quality of the mobile network of the first SIM card is good, network quality of the mobile network of the second SIM card is poor (and/or the mobile network of the second SIM card is abnormal), and the UE is not connected to a WiFi network (and/or network quality of a connected WiFi network is poor), the UE may receive a first switching command sent by the network side device, and execute the process of switching to the VoMobile service, to execute a voice service of the second SIM card through the mobile network of the first SIM card. Therefore, service quality of a voice service of the UE can be improved.

In the embodiments of this application, the first voice service is the VoWiFi service, and the second voice service is the VoMobile service; the first network environment information includes a first network quality parameter of a mobile network of the first SIM card and a second network quality parameter of a mobile network of the second SIM card; and the first target preset condition includes a third preset condition, a fourth preset condition, and a fifth preset condition.

The radio frequency unit 101 is specifically configured to execute, based on the mobile network of the first SIM card, a process of switching to the VoMobile service.

In the embodiments of this application, the third preset condition is that a value of the first network quality parameter is greater than a first threshold.

In the embodiments of this application, the fourth preset condition includes at least one of the following: a value of the second network quality parameter is less than or equal to a second threshold, and the first network environment information includes second information; and the second information is used to indicate that the mobile network of the second SIM card is abnormal.

In the embodiments of this application, the fifth preset condition is one of the following: the first network environment information does not include a network signal parameter of a WiFi network; and the first network environment information includes a network signal parameter of a WiFi network and a value of the network signal parameter is less than or equal to a third threshold.

In this way, it can be learned that, in a case that network quality of the mobile network of the first SIM card is good, network quality of the mobile network of the second SIM card is poor (and/or the mobile network of the second SIM card is abnormal), and the UE is not connected to a WiFi network (and/or network quality of a connected WiFi network is poor), the UE may receive a first switching command sent by the network side device, and execute the process of switching to the VoMobile service, to execute a voice service of the second SIM card through the mobile network of the first SIM card. Therefore, service quality of a voice service of the UE can be improved.

It should be understood that, in the embodiments of this application, the input unit 104 may include a Graphics Processing Unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. In some implementations, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that the modem processor may not be integrated into the processor 110.

The embodiments of this application further provide a readable storage medium. The readable storage medium stores a program or an instruction, and when the program or the instruction is executed by a processor, the processes of the foregoing voice service switching method embodiments are implemented and a same technical effect can be achieved. To avoid repetition, details are not described herein again.

The processor is a processor in the UE in the foregoing embodiments. The readable storage medium includes a computer-readable storage medium, such as a computer Read-Only Memory (ROM), a Random Access Memory (RAM), a magnetic disk, or an optical disc.

The embodiments of this application further provide a chip. The chip includes a processor and a communications interface, the communications interface is coupled to the processor, and the processor is configured to run a program or an instruction to implement the processes of the foregoing voice service switching method embodiments, and a same technical effect can be achieved. To avoid repetition, details are not described herein again.

It should be understood that the chip mentioned in the embodiments of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiments may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A voice service switching method, performed by User Equipment (UE), wherein the UE comprises a first Subscriber Identification Module (SIM) card and a second SIM card, and the voice service switching method comprises:

when the second SIM card executes a first voice service, sending a first switching report message to a network side device, wherein the first switching report message comprises first network environment information, wherein the first network environment information is used to represent network quality of a mobile network corresponding to the UE when the first voice service is executed;

receiving a first switching command message, wherein the first switching command message is sent by the network side device when the first network environment information meets a first target preset condition, wherein the first switching command message is used to instruct the UE to switch the first voice service of the second SIM card to a second voice service; and executing, according to the first switching command message, a process of switching to the second voice service, wherein the first voice service is at least one of the following:

a Voice over Mobile (VoMobile) service;

a Voice over LTE (VoLTE) service; or a Voice over Wireless Fidelity (VoWiFi) service, and wherein when the first voice service is the VoMobile service, the second voice service is the VoWiFi service, and when the first voice service is the VoLTE service or the VoWiFi service, the second voice service is the VoMobile service.

2. The voice service switching method according to claim 1, wherein the first voice service is the VoMobile service, and the second voice service is the VoWiFi service, wherein the first network environment information comprises a first network quality parameter of a mobile network and a network signal parameter of a WiFi network of the first SIM card, wherein the first target preset condition comprises a first preset condition and a second preset condition, wherein the executing a process of switching to the second voice service comprises:

executing, based on the WiFi network, a process of switching to the VoWiFi service, wherein the first preset condition comprises at least one of the following:

a value of the first network quality parameter is less than or equal to a first threshold;

the first network environment information comprises first information; or the first information is used to indicate that the mobile network of the first SIM card is abnormal, and wherein the second preset condition is that a value of the network signal parameter is greater than a third threshold.

3. The voice service switching method according to claim 1, wherein the first voice service is the VoLTE service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, wherein the fourth preset condition is at least one of the following:

a value of the second network quality parameter is less than or equal to a second threshold;

the first network environment information comprises second information; and the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

4. The voice service switching method according to claim 1, wherein the first voice service is the VoWiFi service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, the fourth preset condition comprises at least one of the following:

a value of the second network quality parameter is less than or equal to a second threshold;

the first network environment information comprises second information; or the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

5. User Equipment (UE), comprising:

a first Subscriber Identification Module (SIM) card;

a second SIM card;

a memory storing computer-readable instructions; and a processor coupled to the memory and configured to execute the computer-readable instructions, wherein computer-readable instructions, when executed by the processor, cause the processor to perform operations comprising:

when the second SIM card executes a first voice service, sending a first switching report message to a network side device, wherein the first switching report message comprises first network environment information, wherein the first network environment information is used to represent network quality of a mobile network corresponding to the UE when the first voice service is executed;

receiving a first switching command message, wherein the first switching command message is sent by the network side device when the first network environment information meets a first target preset condition, wherein the first switching command message is used to instruct the UE to switch the first voice service of the second SIM card to a second voice service; and executing, according to the first switching command message, a process of switching to the second voice service, wherein the first voice service is at least one of the following:

a Voice over Mobile (VoMobile) service;

a Voice over LTE (VoLTE) service; or a Voice over Wireless Fidelity (VoWiFi) service, and wherein when the first voice service is the VoMobile service, the second voice service is the VoWiFi service, and when the first voice service is the VoLTE service or the VoWiFi service, the second voice service is the VoMobile service.

6. The UE according to claim 5, wherein the first voice service is the VoMobile service, and the second voice service is the VoWiFi service, wherein the first network environment information comprises a first network quality parameter of a mobile network and a network signal parameter of a WiFi network of the first SIM card, wherein the first target preset condition comprises a first preset condition and a second preset condition, wherein the executing a process of switching to the second voice service comprises:

executing, based on the WiFi network, a process of switching to the VoWiFi service, wherein the first preset condition comprises at least one of the following:

a value of the first network quality parameter is less than or equal to a first threshold;

the first network environment information comprises first information; or the first information is used to indicate that the mobile network of the first SIM card is abnormal, and wherein the second preset condition is that a value of the network signal parameter is greater than a third threshold.

7. The UE according to claim 5, wherein the first voice service is the VoLTE service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, wherein the fourth preset condition is at least one of the following:

a value of the second network quality parameter is less than or equal to a second threshold;

the first network environment information comprises second information; and the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

8. The UE according to claim 5, wherein the first voice service is the VoWiFi service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, the fourth preset condition comprises at least one of the following:

a value of the second network quality parameter is less than or equal to a second threshold;

the first network environment information comprises second information; or the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

9. A non-transitory computer-readable medium storing instructions that, when executed by a processor, cause the processor to perform operations comprising:

when a second SIM card executes a first voice service, sending a first switching report message to a network side device, wherein the first switching report message comprises first network environment information, wherein the first network environment information is used to represent network quality of a mobile network corresponding to a User Equipment (UE) when the first voice service is executed, wherein the UE comprises a first Subscriber Identification Module (SIM) card and the second SIM card;

receiving a first switching command message, wherein the first switching command message is sent by the network side device when the first network environment information meets a first target preset condition, wherein the first switching command message is used to instruct the UE to switch the first voice service of the second SIM card to a second voice service; and executing, according to the first switching command message, a process of switching to the second voice service, wherein the first voice service is at least one of the following:

a Voice over Mobile (VoMobile) service;

a Voice over LTE (VoLTE) service; or a Voice over Wireless Fidelity (VoWiFi) service, and wherein when the first voice service is the VoMobile service, the second voice service is the VoWiFi service, and when the first voice service is the VoLTE service or the VoWiFi service, the second voice service is the VoMobile service.

10. The non-transitory computer-readable medium according to claim 9, wherein the first voice service is the VoMobile service, and the second voice service is the VoWiFi service, wherein the first network environment information comprises a first network quality parameter of a mobile network and a network signal parameter of a WiFi network of the first SIM card, wherein the first target preset condition comprises a first preset condition and a second preset condition, wherein the executing a process of switching to the second voice service comprises:

executing, based on the WiFi network, a process of switching to the VoWiFi service, wherein the first preset condition comprises at least one of the following:

a value of the first network quality parameter is less than or equal to a first threshold;

the first network environment information comprises first information; or the first information is used to indicate that the mobile network of the first SIM card is abnormal, and wherein the second preset condition is that a value of the network signal parameter is greater than a third threshold.

11. The non-transitory computer-readable medium according to claim 9, wherein the first voice service is the VoLTE service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, wherein the fourth preset condition is at least one of the following:

a value of the second network quality parameter is less than or equal to a second threshold;

the first network environment information comprises second information; and the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

12. The non-transitory computer-readable medium according to claim 9, wherein the first voice service is the VoWiFi service, wherein the second voice service is the VoMobile service, wherein the first network environment information comprises a first network quality parameter of a mobile network of the first SIM card and a second network quality parameter of a mobile network of the second SIM card, wherein the first target preset condition comprises a third preset condition, a fourth preset condition, and a fifth preset condition, wherein the executing a process of switching to the second voice service comprises:

executing, based on the mobile network of the first SIM card, a process of switching to the VoMobile service, wherein the third preset condition is that a value of the first network quality parameter is greater than a first threshold, the fourth preset condition comprises at least one of the following:

a value of the second network quality parameter is less than or equal to a second threshold;

the first network environment information comprises second information; or the second information is used to indicate that the mobile network of the second SIM card is abnormal, and wherein the fifth preset condition is one of the following:

the first network environment information does not comprise a network signal parameter of a WiFi network; or the first network environment information comprises a network signal parameter of a WiFi network and a value of the network signal parameter is less than or equal to a third threshold.

* * * * *